(12) United States Patent
Sasa (10) Patent No.: US 7,497,231 B2
(45) Date of Patent: Mar. 3, 2009

(54) FEMALE COUPLING MEMBER OF PIPE COUPLING

(75) Inventor: Takeya Sasa, Ohta-ku (JP)

(73) Assignee: Nitto Kohki Co., Ltd., Tokyo (JP)

( * ) Notice: Subject to any disclaimer, the term of this patent is extended or adjusted under 35 U.S.C. 154(b) by 0 days.

(21) Appl. No.: 11/787,074

(22) Filed: Apr. 13, 2007

(65) Prior Publication Data

US 2007/0199597 A1    Aug. 30, 2007

Related U.S. Application Data

(63) Continuation of application No. PCT/JP2005/018549, filed on Oct. 6, 2005.

(30) Foreign Application Priority Data

Oct. 15, 2004    (JP) ............................. 2004-301113

(51) Int. Cl.
  *F16L 37/36* (2006.01)
(52) U.S. Cl. .................. 137/614.06; 137/614.05; 251/149.9; 285/313
(58) Field of Classification Search ................. 137/614.04–614.06, 613; 285/305, 308, 285/312, 314–316, 276, 317, 322, 313; 251/149.9
  See application file for complete search history.

(56) References Cited

U.S. PATENT DOCUMENTS 2,888,278 A    5/1959   Torres et al.
3,028,179 A *  4/1962   Abramoska ................. 285/317
3,100,655 A *  8/1963   Work .......................... 285/33
3,635,793 A *  1/1972   Kolb et al. ................... 376/364
4,596,272 A *  6/1986   Medvick et al. ......... 137/614.03

(Continued)

FOREIGN PATENT DOCUMENTS

JP    60-158094 U    10/1985

(Continued)

OTHER PUBLICATIONS

International Preliminary Report issued Apr. 17, 2007.

(Continued)

*Primary Examiner*—John Rivell
*Assistant Examiner*—Craig Price
(74) *Attorney, Agent, or Firm*—Brinks Hofer Gilson & Lione (57) ABSTRACT

A female coupling member is provided which includes locking members (32) for securing the female coupling member to a male coupling member (12) inserted into a receiving portion (22) thereof. The receiving portion has an inner surface (35-2) that slidingly engages a forward end outer surface (12-2) of the male member (12) when the male member is inserted into the receiving portion (22) and before it reaches a position where the male and female members are secured to one another by the locking members (32). The receiving portion further has a forward end inner surface (20-1(2)) that slidingly engages an outer surface (12-3) of the male member that is more rearward of the forward end outer surface (12-2) than the engaging portion (12-1) of the male member when the inward inner surface slidingly engages the forward end outer surface (12-2) of the male coupling member.

9 Claims, 5 Drawing Sheets

U.S. PATENT DOCUMENTS

| | | | | |
|---|---|---|---|---|
| 4,693,497 | A | * | 9/1987 | Pettus et al. ................. 285/315 |
| 5,261,707 | A | * | 11/1993 | Kotake et al. ............... 285/308 |
| 5,282,655 | A | * | 2/1994 | Marietta ..................... 285/315 |
| 5,370,423 | A | * | 12/1994 | Guest ......................... 285/308 |
| 5,547,166 | A | * | 8/1996 | Engdahl .................. 251/149.6 |
| 5,575,510 | A | * | 11/1996 | Weh et al. ..................... 285/35 |
| 5,915,738 | A | * | 6/1999 | Guest ......................... 285/315 |
| 5,934,713 | A | * | 8/1999 | Guest ......................... 285/322 |
| 5,954,370 | A | * | 9/1999 | Pietersen ....................... 285/7 |
| 6,035,894 | A | * | 3/2000 | Weh et al. ............. 137/614.06 |
| 6,086,044 | A | * | 7/2000 | Guest ...................... 251/149.9 |
| 6,349,978 | B1 | * | 2/2002 | McFarland et al. .......... 285/319 |
| 6,926,312 | B2 | * | 8/2005 | Lacroix et al. .............. 285/317 |
| 2006/0118184 | A1 | | 6/2006 | Mikiya et al. |

FOREIGN PATENT DOCUMENTS

| | | | |
|---|---|---|---|
| JP | 63-121890 U | | 8/1988 |
| JP | 01299396 A | * | 12/1989 |

OTHER PUBLICATIONS

Office Action issued Jul. 11, 2008 in Chinese application No. 200580040895.0 (with translation).

* cited by examiner

FEMALE COUPLING MEMBER OF PIPE COUPLING

This application is a continuation of PCT/JP2005/018549, filed Oct. 6, 2005, which claims priority to Japanese Application No. JP2004-30113, filed Oct. 15, 2004. The entire contents of these applications are incorporated herein by reference.

BACKGROUND OF THE INVENTION

1. Field of the Invention

The present invention relates to pipe couplings and, more particularly, to a female coupling member of a pipe coupling suitable for handling a high-pressure fluid.

2. Description of the Related Arts

A pipe coupling is generally arranged such that a male coupling member is inserted into a female coupling member, and in this state, the two coupling members are coupled and locked in coupled relation. As a common means for locking the male and female coupling members in coupled relation, balls are radially displaceably provided in a male coupling member receiving portion of the female coupling member. When the male coupling member is inserted into the male coupling member receiving portion, the balls are displaced radially inwardly to engage into a ball receiving recess provided on the outer peripheral surface of the male coupling member (see Japanese Patent Application No. 2003-133618).

These balls, however, need to be strongly pressed against the ball receiving recess of the male coupling member when the pipe coupling handles a high-pressure fluid, for example. In such a case, the ball receiving recess is likely to be dented by the balls and may become incapable of satisfactorily performing the desired locking function after use for a certain period of time.

Meanwhile, a collet chuck type locking means is used occasionally. This locking means has a plurality of locking members that are provided at a predetermined regular interval around the male coupling member receiving portion of the female coupling member and that extend in a direction in which the male coupling member is received in the male coupling member receiving portion. The locking members are pivotably supported in a lever fashion. Latch portions provided at the forward ends of the locking members are engaged or disengaged with respect to a locking recess provided on the outer peripheral surface of the male coupling member (see U.S. Pat. No. 2,888,278).

The latch portions of the locking members cause a reduced degree of denting compared to that of the above-described balls. However, the locking members are provided at a forward end portion of the male coupling member receiving portion of the female coupling member, and are adapted to lock the male coupling member by receiving it into a space defined by the locking members having their latch portions expanded radially outwardly and then displacing the latch portions radially inwardly into engagement with the locking recess. Therefore, the male coupling member and the female coupling member cannot always be accurately centered when they are locked by latching. As a result, the male coupling member and the female coupling member may fail to be connected properly.

SUMMARY OF THE INVENTION

An object of the present invention is to provide a pipe coupling, particularly a female coupling member, free from the above-described problem of the collet chuck type locking means.

That is, the present invention provides a female coupling member (denoted by reference numeral 10 in the embodiments of the present invention explained herein below) of a pipe coupling. The female coupling member (10) has a female coupling member body (20) with a tubular wall (corresponding to a first body member 20-1 in the embodiments) having a male coupling member receiving portion (22) extending from the forward end toward the rear end thereof. The female coupling member (10) further has locking members (32) mounted on the tubular wall to extend in the axial direction of the tubular wall (in the male coupling member receiving direction). The locking members (32) have latch portions (32-1) at forward ends thereof that engage an engaging portion (12-1) formed on the outer peripheral surface of a male coupling member (12) as inserted into the male coupling member receiving portion to lock the male coupling member (12) in the female coupling member body (20).

The tubular wall (20-1) has a support portion (35-1) that supports the locking members in a lever fashion so that lever-fashion movement of the locking members about the support portion causes the latch portions (32-1) to be displaced between a latching position where the latch portions engage the engaging portion (12-1) of the male coupling member as inserted into the male coupling member receiving portion and an unlatching position where the latch portions are displaced radially outwardly from the latching position to disengage from the engaging portion of the male coupling member, thereby allowing the male coupling member to be pulled out of the male coupling member receiving portion. The tubular wall (20-1) further has radial through-holes (20-1(1)) provided to extend radially through the tubular wall to allow the latch portions (32-1) of the locking members (32) to be radially displaced between the latching position and the unlatching position through the tubular wall.

The male coupling member receiving portion (22) has an inward inner surface (35-2) that slidingly engages a forward end outer peripheral surface (12-2) of the male coupling member (12) when the male coupling member (12) is inserted into the male coupling member receiving portion (22) and before the male coupling member (12) reaches a position where the engaging portion (12-1) of the male coupling member (12) is engaged by the latch portions (32-1) of the locking members (32) as placed in the latching position. The male coupling member receiving portion (22) further has a forward end inner surface (20-1(6)) that slidingly engages an outer peripheral surface (12-3) of the male coupling member that is more rearward of the forward end outer peripheral surface (12-2) than the engaging portion (12-1) of the male coupling member at the same time as the inward inner surface slidingly engages the forward end outer peripheral surface (12-2) of the male coupling member.

The female coupling member (10) further comprises locking member actuating means (24) for pressing the locking members (32) into the latching position in a state where the male coupling member has been inserted to the lock position in the male coupling member receiving portion (22).

In this female coupling member, the male coupling member can be coupled to the female coupling member in a state where the male coupling member has been accurately centered with respect to the female coupling member because the male coupling member receiving portion (22) has an inward inner surface (35-2) that slidingly engages a forward end outer peripheral surface (12-2) of the male coupling member (12) when the male coupling member (12) is inserted into the male coupling member receiving portion (22) and before the male coupling member (12) reaches a position where the engaging portion (12-1) of the male coupling member (12) is engaged by the latch portions (32-1) of the locking members (32) as placed in the latching position and the male coupling member receiving portion (22) further has a forward end inner surface (20-1(6)) that slidingly engages an outer peripheral surface (12-3) of the male coupling member that is more rearward of the forward end outer peripheral surface (12-2) than the engaging portion (12-1) of the male coupling member at the same time as the inward inner surface slidingly engages the forward end outer peripheral surface (12-2) of the male coupling member.

Specifically, the locking member actuating means (24) may have an actuating sleeve provided on the outer peripheral surface of the tubular wall at a position radially outward of the locking members. The actuating sleeve is displaceable in the axial direction between a press-latch position where the actuating sleeve presses the locking members radially inward at a portion of each locking member closer to the forward end than the support portion to press the latch portions of the locking members into the latching position and a press-unlatch position where the actuating sleeve presses the locking members radially inward at a portion of each locking member closer to the rear end than the support portion, thereby causing the latch portions of the locking members to assume the unlatching position.

More specifically, the arrangement may be as follows. Each locking member (32) has a radially outer surface that has a flat portion (32-5) extending axially in a state where the latch portion (32-1) of the locking member (32) is in the latching position. The radially outer surface of each locking member (32) further has a first protruded portion (32-7) protruded radially outward at a position more forward of the flat portion than the support portion and a second protruded portion (32-6) protruded radially outward at a position more rearward of the flat portion than the support portion.

The actuating sleeve (40) has first and second latch holders. When the actuating sleeve is in the press-latch position, the first latch holder (40-2) engages under pressure the first protruded portion (32-7) of each locking member, and the second latch holder (46) is positioned forward of the second protruded portion (32-6) to press the latch portion of the locking member into the latching position. When the actuating sleeve is in the press-unlatch position, the first latch holder is positioned rearward of the first protruded portion of the locking member, and the second latch holder engages under pressure the second protruded portion of the locking member, causing the latch portion of the locking member to assume the unlatching position.

Even more specifically, the arrangement may be as follows. The inner peripheral surface at the forward end of the actuating sleeve (40) forms the first latch holder (40-2). The sleeve has balls (46) that have portions projecting radially inward from the inner peripheral surface of the sleeve at a position rearward of the forward end thereof. The projecting portions of the balls form the second latch holder.

The locking member actuating means (24) may have a sleeve locking member (42) provided in the male coupling member receiving portion (22) so as to be displaceable in the axial direction between an actuating sleeve locking position and an actuating sleeve unlocking position, a first urging member (44) that urges the sleeve locking member (42) into the actuating sleeve locking position, and a sleeve engaging member (34) that is engaged with the actuating sleeve (40) by the sleeve locking member (42) as placed in the actuating sleeve locking position to hold the actuating sleeve in the press-unlatch position, and that allows the actuating sleeve (40) to be displaced to the press-latch position in response to displacement of the sleeve locking member to the actuating sleeve unlocking position.

Further, the arrangement may be as follows. The sleeve engaging member (34) comprises sleeve engaging balls radially displaceably provided in radial holes (20-1(4)) radially extending through the tubular wall (20-1). The actuating sleeve (40) has a ball receiving recess (40-1) on the inner peripheral surface thereof that radially aligns with the sleeve engaging balls when the actuating sleeve is in the press-unlatch position. The sleeve locking member (42) has an outer surface that has a ball pressing portion (42-1) that engages the sleeve engaging balls when the sleeve locking member is in the actuating sleeve locking position, causing the balls to be engaged in the ball receiving recess (40-1) under pressure. The outer surface of the sleeve locking member (42) further has a ball releasing portion (42-2) that allows the sleeve engaging balls to be displaced radially inward to disengage from the ball receiving recess (40-1) when the sleeve locking member is in the actuating sleeve unlocking position.

Preferably, the female coupling member further comprises an on-off valving element (26) provided in the male coupling member receiving portion so as to be displaceable in the axial direction between a forward closed position where the on-off valving element closes a fluid passage that is provided in the female coupling member body in contiguity with the male coupling member receiving portion in the axial direction and a rear open position where the on-off valving element opens the fluid passage, and second urging means (50) for urging the on-off valving element (26) into the forward closed position. The sleeve locking member (42) and the on-off valving element (26) are pushed rearward in the male coupling member receiving portion (22) by the male coupling member (12) as inserted thereinto, and when the on-off valving element (26) is placed in the rear open position, the sleeve locking member (42) is placed in the sleeve unlocking position.

Preferably, the female coupling member body has a second on-off valving element (28) for opening and closing the fluid passage, and the actuating sleeve (40) allows the second on-off valving element to open only when the actuating sleeve is in the press-latch position.

Preferably, a safety tube (56) is provided at the forward end of the female coupling member body. The safety tube is located radially outside the actuating sleeve when in the press-latch position to prevent external access to the actuating sleeve.

In the female coupling member according to the present invention, the male coupling member can be sufficiently inserted into the male coupling member receiving portion of the female coupling member before the male coupling member is inserted to the lock position in the female coupling member. Particularly, the forward end outer peripheral surface of the male coupling member and an outer peripheral surface rearward thereof slidingly engage the wall surface that defines the male coupling member receiving portion, whereby the male coupling member can be locked by the locking members in a state where the male coupling member has been centered with respect to the female coupling member. Accordingly, the male coupling member and the female coupling member can be coupled more appropriately than in the prior art.

When a high-pressure fluid is handled, in particular, it is possible to effect reliable coupling that cannot be achieved by the ball-type locking means while resolving the disadvantages of the conventional couplings having the collet chuck type locking means.

DESCRIPTION OF THE PREFERRED EMBODIMENTS

An embodiment of the pipe coupling according to the present invention will be described with reference to the accompanying drawings.

Figure 1:
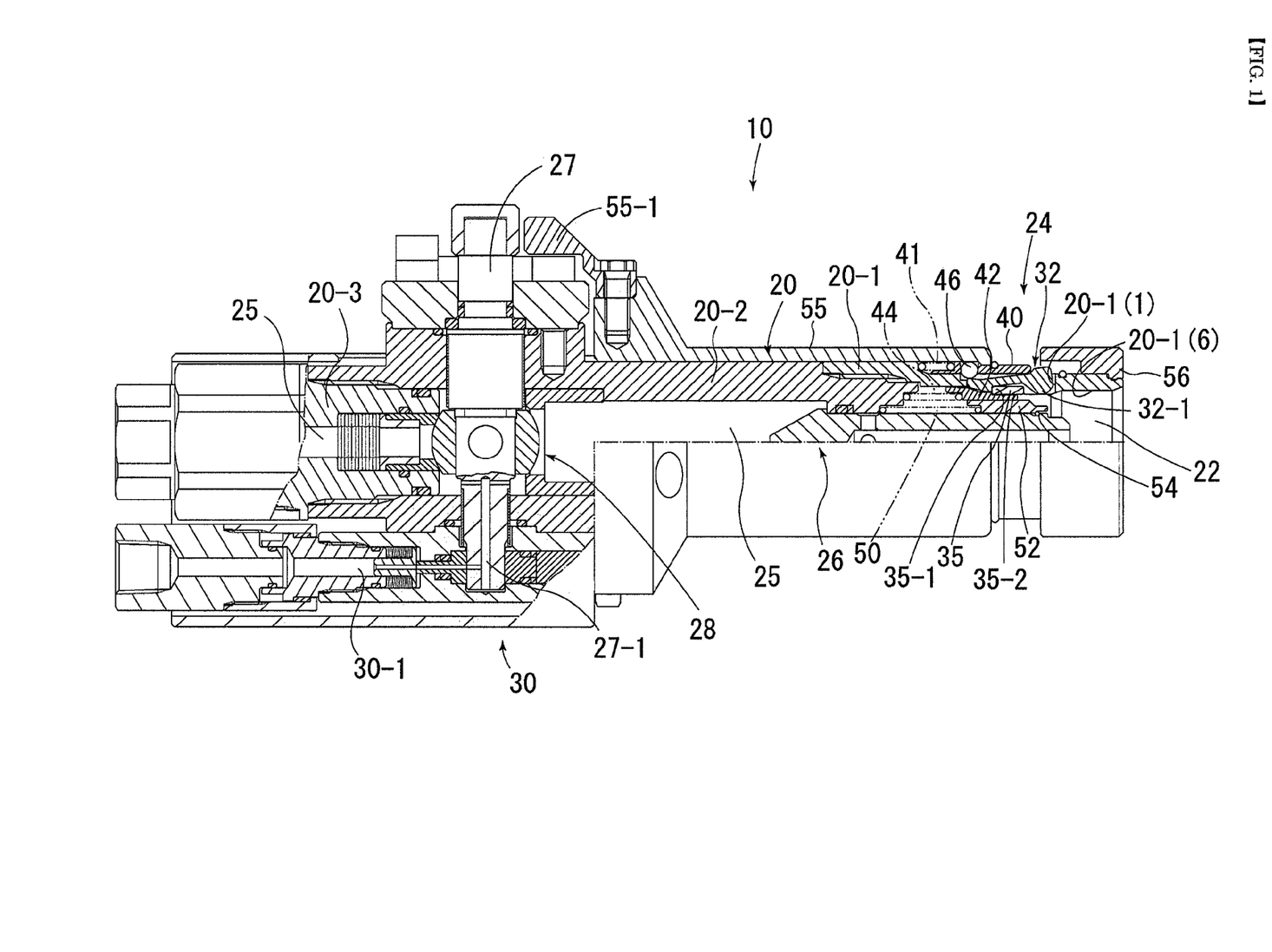
FIG. 1 is a longitudinal sectional view of a female coupling member according to the present invention.
Figure 2:
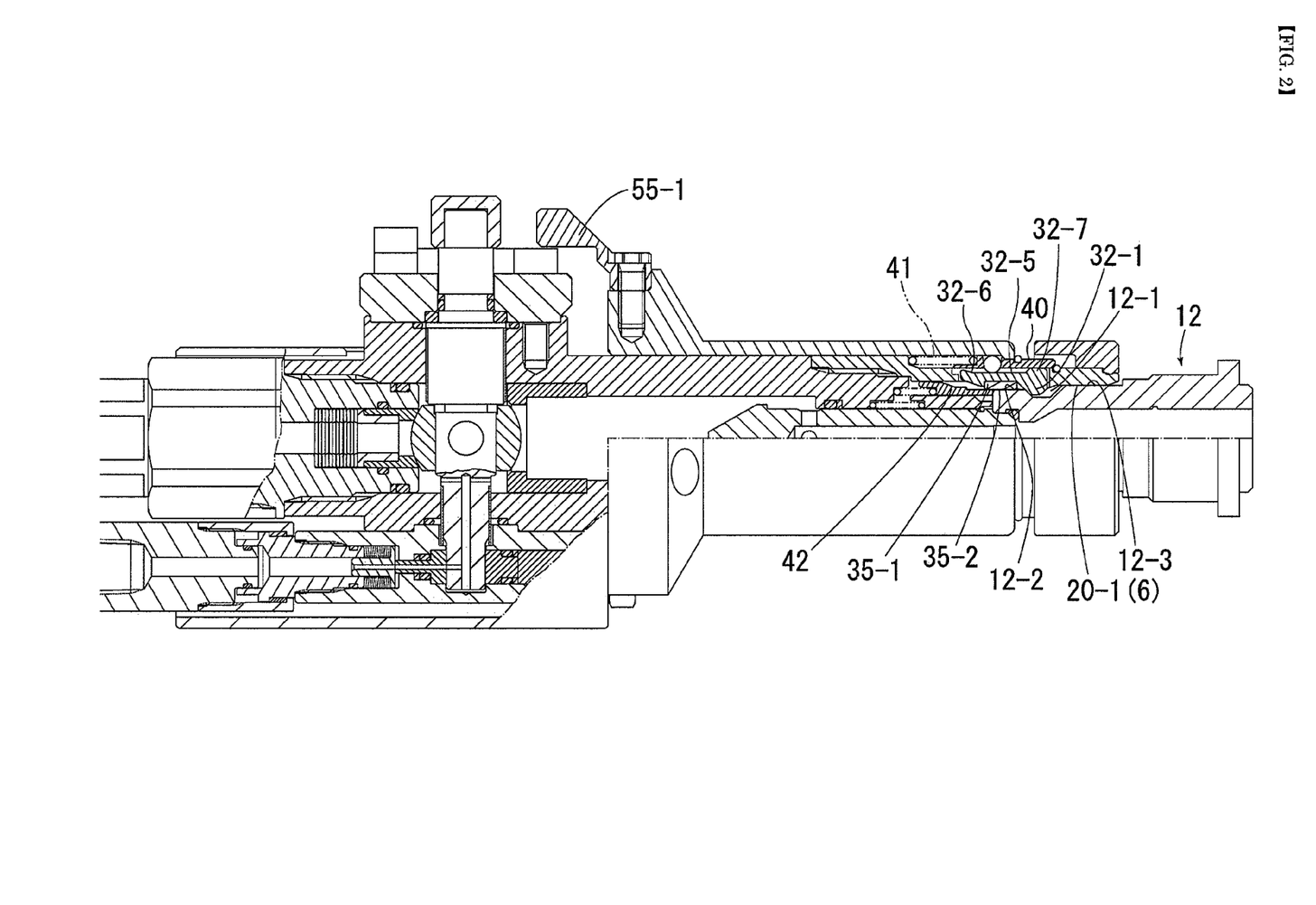
FIG. 2 is a longitudinal sectional view showing a state where a male coupling member has been inserted into the female coupling member shown in FIG. 1 and a second on-off valving element has not yet been opened.
Figure 3:
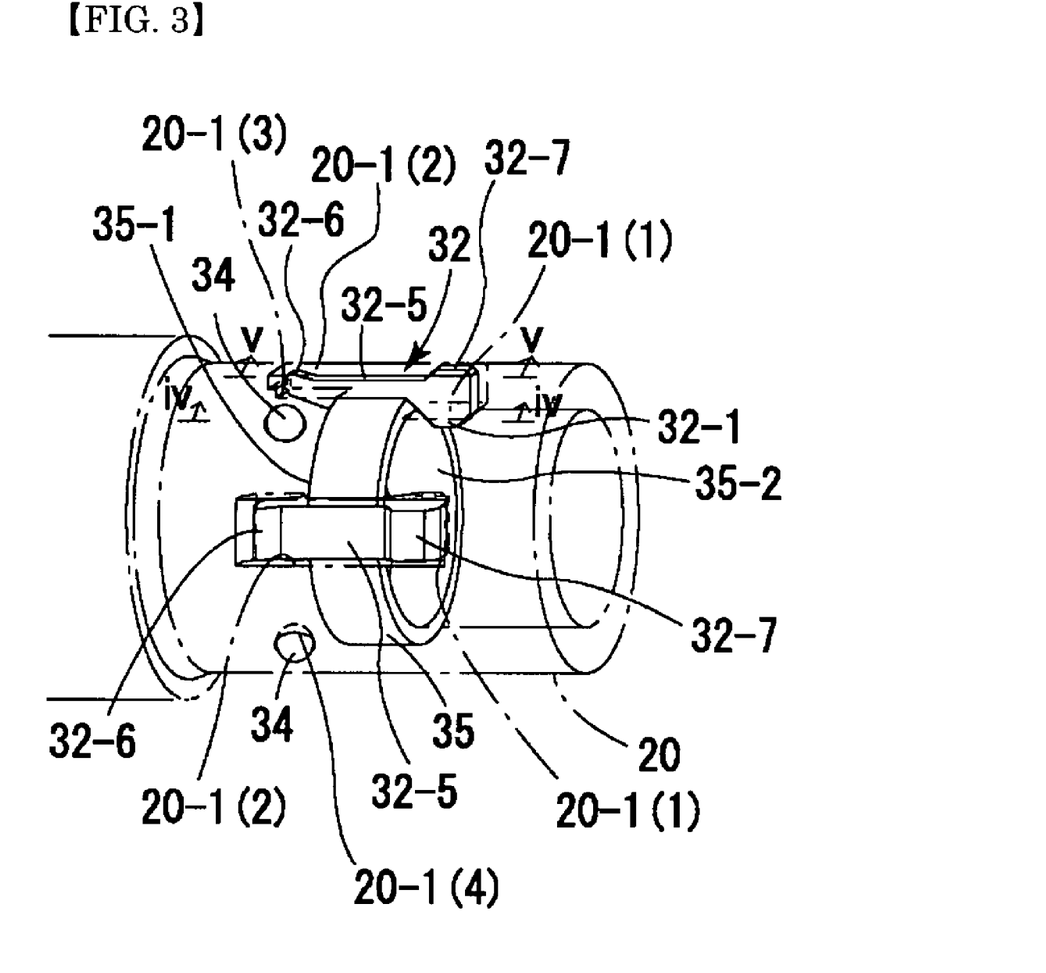
FIG. 3 is a perspective view in which a female coupling member body of the female coupling member shown in FIG. 1 is shown by the imaginary lines (chain lines), and locking members and so forth that are mounted on the female coupling member body are shown by the solid lines.
Figure 4:
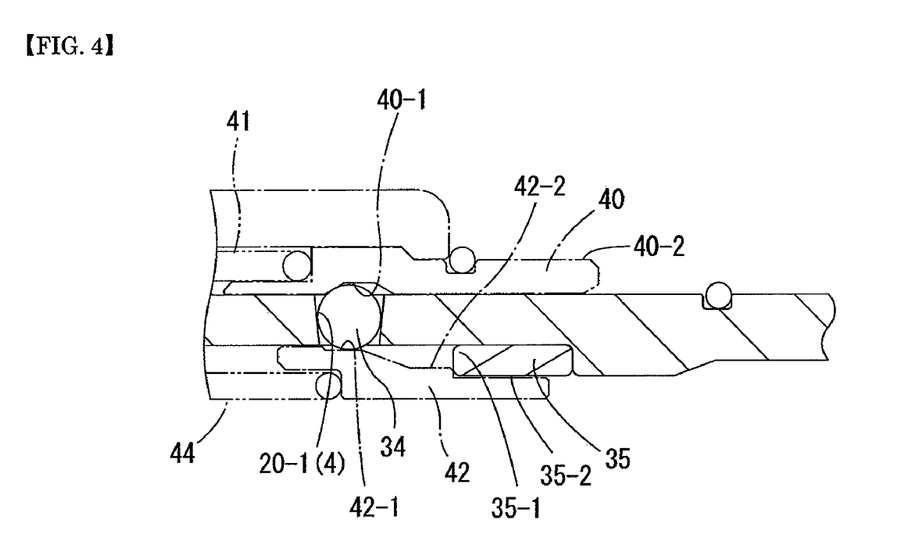
FIG. 4 is a sectional view taken along the line IV-IV in FIG. 3, in which the female coupling member body is shown by the solid lines, and an actuating sleeve and so forth that are slidably mounted outside the female coupling member body are shown by the imaginary lines.
Figure 5:
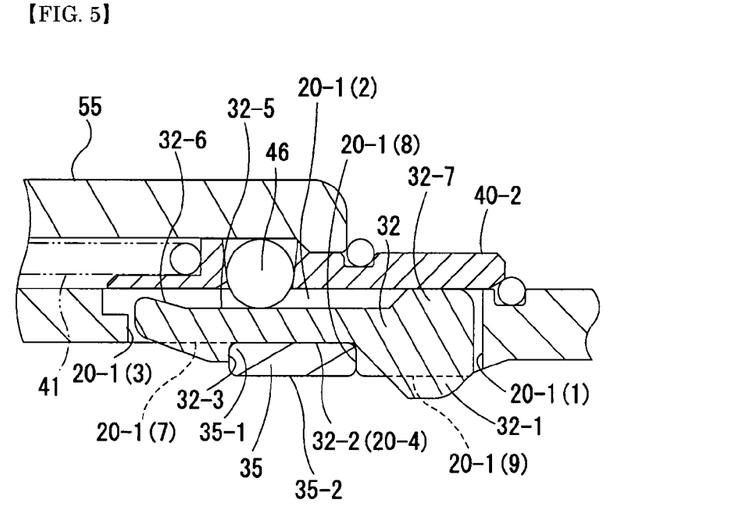
FIG. 5 is a sectional view taken along the line V-V in FIG. 3, showing one locking member that is in a latching position.

FIG. 1 is a longitudinal sectional view of a female coupling member 10 according to the present invention. FIG. 2 is a longitudinal sectional view showing a state where a male coupling member 12 has been inserted in the female coupling member 10 shown in FIG. 1. FIG. 3 is a perspective view in which a female coupling member body (described later) is shown by the imaginary lines (chain lines), and locking members (described later) and so forth that are mounted on the female coupling member body are shown by the solid lines. FIG. 4 is a sectional view taken along the line IV-IV in FIG. 3, in which the female coupling member body is shown by the solid lines, and an actuating sleeve (described later) and so forth that are slidably mounted outside the female coupling member body are shown by the imaginary lines. FIG. 5 is a sectional view taken along the line V-V in FIG. 3.

As shown in the figures, the female coupling member 10 has a generally tubular female coupling member body 20. More specifically, the female coupling member body 20 comprises a first body member 20-1, a second body member 20-2 and a third body member 20-3 that are successively disposed from the forward end toward the rear end thereof and in thread engagement with each other.

The first body member 20-1 has a male coupling member receiving portion 22 for receiving the male coupling member 12 and male coupling member locking means 24 (for locking the male coupling member 12 received in the male coupling member receiving portion 22).

The second body member 20-2 has a fluid passage 25 communicating with the male coupling member receiving portion 22 of the first body member 20-1. The second body member 20-2 further has a poppet type first on-off valving element 26 for opening and closing the fluid passage 25 and a ball type second on-off valving element 28 mounted on a shaft 27 and rotated as the shaft 27 rotates about its own center axis.

Further, the second body member 20-2 is provided with a residual pressure discharge pipe 30 having a residual pressure discharge opening 30-1 that communicates with a residual pressure discharge bore 27-1 formed in the shaft 27 so as to communicate with the fluid passage 25 when the second on-off valving element 28 is placed in the closed position shown in FIG. 1, thereby discharging a residual pressure in the fluid passage 24 to the outside when the on-off valving element 28 is in the closed position.

The third body member 20-3 is connectable with a pipe P connected to a high-pressure fluid source (not shown).

FIG. 3 shows a positional relationship with respect to the first body member 20-1 of locking members 32 (which are members constituting the male coupling member locking means 24) and actuating sleeve locking balls 34 that are attached to the first body member 20-1. FIG. 4 is a sectional view as seen in the direction of the line IV-IV in FIG. 3.

As will be clear from FIGS. 1 to 6, each locking member 32 is an elongated member extending in the axial direction of the first body member 20-1 (i.e. in the male coupling member receiving direction) and has at the forward end thereof a latch portion 32-1 that engages an engaging portion 12-1, i.e. annular recess, formed on the outer peripheral surface of the male coupling member 12 (inserted as shown in FIG. 2) to lock the male coupling member 12 in the female coupling member body 20.

Figure 6:
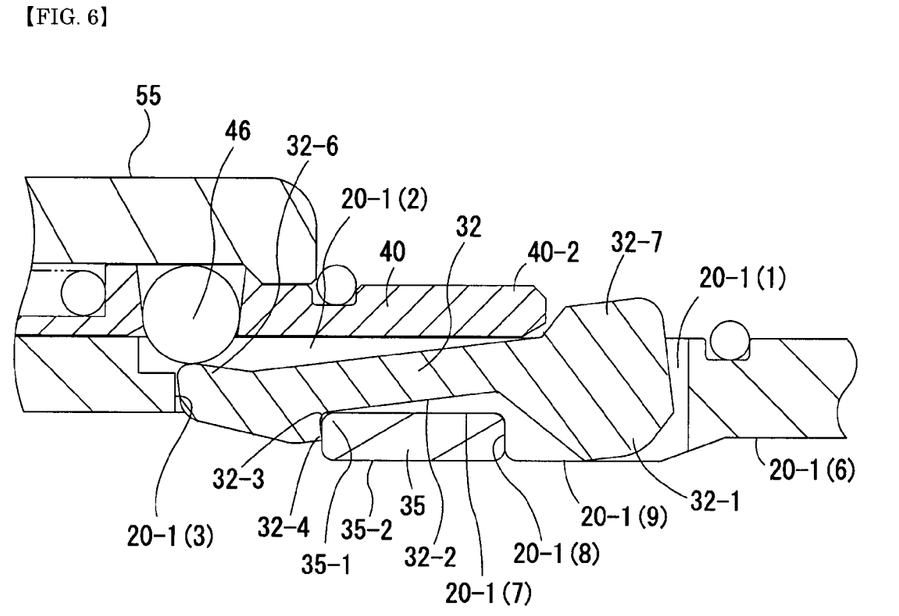
FIG. 6 is a view similar to FIG. 5, showing one locking member that is in an unlatching position.

The first body member 20-1 has a support portion formed on the inner peripheral surface thereof to support the locking members 32 in a lever fashion. In the illustrated example, an annular ring 35 is engaged and secured to the inner peripheral surface of the first body member 20-1 to support the locking members 32. More specifically, the locking members 32 are supported by a left-top corner portion 35-1 (serving as a support portion) of the annular ring 35 as seen in FIG. 1. That is, the locking members 32 are supported to move in a lever fashion so that the latch portion 32-1 is movable between a latching position where the latch portion 32-1 engages the engaging portion 12-1 of the male coupling member 12 inserted into the male coupling member receiving portion 22, as shown in FIGS. 2 and 5, and an unlatching position where the latch portion 32-1 is, as shown in FIGS. 1 and 6, displaced radially outward from the latching position to disengage from the engaging portion 12-1 of the male coupling member 12, thereby allowing the male coupling member to be pulled out of the male coupling member receiving portion. Speaking more precisely, the radially inner surface of each locking member 32 has a surface 32-2 contacting the outer peripheral surface of the annular ring 35 (when the locking member is in the latching position shown in FIG. 5) and a surface 32-3 contacting the left end surface of the annular ring as seen in the figures. When the locking member 32 moves like a lever on the annular ring 35, the forward end 32-4 of the surface 32-3 engages the left end surface of the annular ring 35, as shown in FIG. 6. Thus, the locking member 32 turns around the forward end 32-4 serving as a fulcrum.

The tubular wall of the first body member 20-1 is formed with radial through-holes 20-1(1) radially extending through the tubular wall to enable the respective latch portions 32-1 of the locking members 32 to be radially displaced between the latching position (FIG. 2) and the unlatching position (FIG. 1) through the tubular wall. More specifically, the tubular wall of the first body member 20-1 has, as shown in FIG. 3, elongated locking member accommodating holes 20-1(2) circumferentially spaced at approximately 90°. Each locking member accommodating hole 20-1(2) extends in the axial direction of the first body member and radially extends through the annular wall thereof. The annular ring 35 is provided so as to intersect approximately intermediate positions in the axial direction of the locking member accommodating holes 20-1(2). The above-described radial through-holes 20-1(1) are formed at the forward side of the annular ring 35, and second radial through-holes 20-1(3) are formed at the rear side of the annular ring 35.

The inner peripheral surface 35-2 of the annular ring 35 (i.e. the inward inner surface of the male coupling member receiving portion 22 defined in the appended claims) and the forward end inner peripheral surface 20-1(6) of the first body member 20-1 (i.e. the inner peripheral surface of the first body member 20-1 at a position forward of the locking member accommodating holes 20-1(2)) extend parallel to the axis of the first body member 20-1. The inner peripheral surface 35-2 of the annular ring 35 slidingly engages the forward end outer peripheral surface 12-2 of the male coupling member 12 (when the male coupling member 12 is inserted into the male coupling member receiving portion 22 and before the male coupling member 12 reaches a position where the engaging portion 12-1 of the male coupling member 12 is engaged by the latch portions 32-1 of the locking members 32). At the same time, the forward end inner peripheral surface 20-1(6) of the first body member 20-1 (i.e., the forward end inner surface of the male coupling member receiving portion 22 defined in the appended claims) slidingly engages an outer peripheral surface 12-3 of the male coupling member 12 that is more rearward of the forward end outer peripheral surface 12-2 than the engaging portion 12-1 of the male coupling member 12. Thus, the male coupling member 12 is centered with respect to the female coupling member 10 before the engaging portion 12-1 of the male coupling member 12 is engaged by the latch portions 32-1 of the locking members 32 to lock the male coupling member 12. More specifically, the inner peripheral surface of the first body member 20-1 has, as shown in FIG. 5, a large-diameter inner peripheral surface 20-1(7) against which the outer peripheral surface of the annular ring 35 abuts, and a shoulder-shaped surface 20-1(8) against which the right end surface of the annular ring 35 abuts. The inner peripheral surface of the first body member 20-1 further has a small-diameter inner peripheral surface 20-1(9) that is contiguous with the shoulder-shaped surface and that has the same diameter as that of the inner peripheral surface of the annular ring 35. Thus, the inward inner surface of the male coupling member receiving portion 22 (defined in the appended claims), which slidingly engages the forward end outer peripheral surface 12-2 of the male coupling member 12, comprises the small-diameter inner peripheral surface 20-1(9) of the first body member and the inner peripheral surface 35-2 of the annular ring 35 to enable the male coupling member 12 to be centered with respect to the female coupling member 10.

Each locking member 32 has, as shown in FIGS. 2, 3 and 5, a radially outer surface that has a flat portion 32-5 extending axially in the latching position where the latch portion 32-1 engages the engaging portion 12-1 of the male coupling member 12. The radially outer surface of the locking member 32 further has a protruded portion 32-6 slantingly protruded radially outward from the rear end of the flat portion 32-5 and another protruded portion 32-7 slantingly protruded radially outward from the forward end of the flat portion 32-5.

An actuating sleeve 40 is provided on the outer peripheral surface of the tubular wall of the first body member 20-1. The actuating sleeve 40 has balls 46 (defined as second latch holders in the appended claims) fitted in radial through-holes provided in the actuating sleeve 40. The balls 46 partly project inward from the inner peripheral surface of the actuating sleeve 40. When the actuating sleeve 40 is in a press-latch position as shown in FIGS. 2 and 5, a forward end portion 40-2 of the actuating sleeve 40 (defined as a first latch holder in the appended claims) engages the protruded portion 32-7 of the locking member 32 and presses it radially inward, and the balls 46 are positioned forward of the protruded portion 32-6, causing the latch portion 32-1 of the locking member 32 to engage the engaging portion 12-1 of the male coupling member 12. When the actuating sleeve 40 is in a press-unlatch position as shown in FIGS. 1 and 6, the forward end portion 40-2 of the actuating sleeve 40, which serves as the first latch holder, is positioned rearward of the protruded portion 32-7 of the locking member 32, and the balls 46, which serve as the second latch holder, engage under pressure the protruded portion 32-6 of the locking member 32, causing the latch portion 32-1 of the locking member 32 to assume the above-described unlatching position. Reference numeral 41 denotes a coil spring that urges the actuating sleeve 40 into the press-latch position shown in FIG. 2.

The first body member 20-1 has a tubular sleeve locking member 42 provided in the male coupling member receiving portion such that the sleeve locking member 42 is axially displaceable between an actuating sleeve locking position (shown in FIGS. 4 and 1) and an actuating sleeve unlocking position shown in FIG. 2. Further, the first body member 20-1 is provided in the male coupling member receiving portion with a first urging member 44 that urges the sleeve locking member 42 into the actuating sleeve locking position, and further has sleeve engaging members 34 (FIGS. 3 and 4) that are pressed by the sleeve locking member 42 when the sleeve locking member 42 placed in the actuating sleeve locking position (FIGS. 1 and 4) so that the sleeve engaging members 34 engage a recess 40-1 provided on the inner peripheral surface of the actuating sleeve 40 to hold the actuating sleeve 40 in the press-unlatch position (i.e. the position where the latch portions 32-1 of the locking members 32 are disengaged from the engaging portion 12-1 of the male coupling member 12). In response to the displacement of the sleeve locking member 42 to the actuating sleeve unlocking position (FIG. 2), the sleeve engaging members 34 allow the actuating sleeve 40 to be displaced to the press-latch position (i.e. the position where the latch portions 32-1 of the locking members 32 engage under pressure the engaging portion 12-1 of the male coupling member 12).

In the illustrated example, the sleeve engaging members 34 are, as shown in FIGS. 3 and 4, actuating sleeve locking balls radially displaceably provided in third radial holes 20-1(4) radially extending through the tubular wall of the first body member 20-1. The recess 40-1 provided on the inner peripheral surface of the actuating sleeve 40 is adapted to radially align with the sleeve engaging members 34 when the actuating sleeve 40 is in the press-unlatch position (FIG. 1). The sleeve locking member 42 has an outer surface that has a ball pressing portion 42-1 that engages the sleeve engaging members 34 when the sleeve locking member 42 is in the actuating sleeve locking position shown in FIG. 1, thereby causing the balls 34 to engage under pressure the ball receiving recess 40-1 of the actuating sleeve 40. The outer surface of the sleeve locking member 42 further has a ball releasing portion 42-2 that allows the actuating sleeve locking balls 34 to be displaced radially inward to disengage from the recess 40-1 when the sleeve locking member 42 is in the actuating sleeve unlocking position shown in FIG. 2.

The first on-off valving element 26 is urged toward a forward closed position shown in FIG. 1 by a coil spring 50. The coil spring 50 is axially displaceably installed around the first on-off valving element 26 between a spring retaining sleeve 52, which is engaged by a stop ring 54 secured around the first on-off valving element 26, and the second body member 20-2.

The sleeve locking member 42 and the first on-off valving element 26 are pushed rearward in the male coupling member receiving portion 22 by the male coupling member 12 as inserted thereinto. When the first on-off valving element is placed in the rear open position (shown in FIG. 2), the sleeve locking member 42 is placed in the sleeve unlocking position, thereby allowing the actuating sleeve 40 to be displaced by a coil spring 41 to the position shown in FIG. 2.

A tubular member 55 is secured to the outer peripheral surface of the actuating sleeve 40. The tubular member 55 slides axially on the second body member 20-2 in response to the axial displacement of the actuating sleeve 40. That is, in a state such as that shown in FIG. 1, a left end portion 55-1 of the tubular member 55, as seen in the figure, is positioned in close proximity to the upper end portion of the shaft 27 (to which a shaft rotating lever is to be attached) to prevent rotation of the shaft with the lever. That is, the second on-off valving element 28 is prevented from rotating from the closed position shown in FIG. 1 to the open position. When the tubular member 55 is, as shown in FIG. 2, displaced rightward as seen in the figure, together with the actuating sleeve, the left end portion 55-1 moves away from the upper end portion of the shaft 27 to permit rotation of the shaft 27, thereby allowing the second on-off valving element 28 to rotate from the closed position shown in FIG. 1 to the open position. Thus, the second on-off valving element 28 is allowed to open only when the male coupling member 12 has been completely inserted into the female coupling member 10 and locked by the locking members 32.

It should be noted that a safety tube 56 is provided at the forward end of the female coupling member body 20. The safety tube 56 is located radially outside the actuating sleeve 40 when in the press-latch position (FIG. 2) to prevent external access to the actuating sleeve.

The invention claimed is:

1. A female coupling member of a pipe coupling, the female coupling member comprising:
    a female coupling member body with a tubular wall having a male coupling member receiving portion extending from a forward end toward a rear end thereof; and
    a locking member mounted on the tubular wall and extending in an axial direction of the tubular wall, the locking member having a latch portion at a forward end thereof that engages an engaging portion formed on an outer peripheral surface of a male coupling member as inserted into the male coupling member receiving portion to lock the male coupling member in the female coupling member body;
    the tubular wall comprising:
    a fulcrum portion that is positioned radially inside and engages the locking member to support the locking member in a lever fashion, and
    a radial through-hole positioned adjacent to the fulcrum portion and extending through the tubular wall;
    the locking member being configured to turn about the fulcrum portion between a latching position where the latch portion extends through the through-hole and engages the engaging portion of the male coupling member as inserted into the male coupling member receiving portion and an unlatching position where the latch portion is displaced radially outward from the latching position to disengage from the engaging portion of the male coupling member, thereby allowing the male coupling member to be pulled out of the male coupling member receiving portion; and
    the tubular wall further having:
    an inward inner surface that slidingly engages a forward end outer peripheral surface of the male coupling member when the male coupling member is inserted into the male coupling member receiving portion and before the male coupling member reaches a lock position where the engaging portion of the male coupling member is engaged by the latch portion of the locking member as placed in the latching position; and
    a forward end inner surface that slidingly engages an outer peripheral surface of the male coupling member that is more rearward of the forward end outer peripheral surface than the engaging portion of the male coupling member at a same time as the inward inner surface slidingly engages the forward end outer peripheral surface of the male coupling member;
    the female coupling member further comprising:
    locking member actuating device for pressing the latch portion of the locking member into the latching position in a state where the male coupling member has been inserted to the lock position in the male coupling member receiving portion.

2. A female coupling member according to claim 1, wherein the locking member actuating device has an actuating sleeve provided on an outer peripheral surface of the tubular wall at a position radially outward of the locking member, the actuating sleeve being displaceable in the axial direction between a press-latch position where the actuating sleeve presses the locking member radially inward at a portion of the locking member closer to the forward end than the fulcrum portion to press the latch portion of the locking member into the latching position and a press-unlatch position where the actuating sleeve presses the locking member radially inward at a portion of the locking member closer to the rear end than the fulcrum portion, thereby causing the latch portion of the locking member to assume the unlatching position.

3. A female coupling member according to claim 2, wherein the locking member has a radially outer surface that has:
    a flat portion extending axially in a state where the latch portion of each locking member is in the latching position;
    a first protruded portion protruded radially outward at a position more forward of the flat portion than the fulcrum portion; and
    a second protruded portion protruded radially outward at a position more rearward of the flat portion than the fulcrum portion;
    the actuating sleeve having first and second latch holders;
    wherein when the actuating sleeve is in the press-latch position, the first latch holder engages under pressure the first protruded portion of the locking member and the second latch holder is positioned forward of the second protruded portion so as to press the latch portion of the locking member into the latching position, whereas when the actuating sleeve is in the press-unlatch position, the first latch holder is positioned rearward of the first protruded portion of the locking member and the second latch holder engages under pressure the second protruded portion of the locking member, causing the latch portion of the locking member to assume the unlatching position.

4. A female coupling member according to claim 3, wherein an inner peripheral surface at a forward end of the sleeve forms the first latch holder;

the sleeve having balls that have portions projecting radially inward from the inner peripheral surface of the sleeve at a position rearward of the forward end thereof, the projecting portions of the balls forming the second latch holder.

5. A female coupling member according to claim 3, wherein the locking member actuating device comprises:
   a sleeve locking member provided in the male coupling member receiving portion so as to be displaceable in the axial direction between an actuating sleeve locking position and an actuating sleeve unlocking position;
   a first urging member that urges the sleeve locking member into the actuating sleeve locking position; and
   a sleeve engaging member that is engaged with the actuating sleeve by the sleeve locking member as placed in the actuating sleeve locking position to hold the actuating sleeve in the press-unlatch position, and that allows the actuating sleeve to be displaced to the press-latch position in response to displacement of the sleeve locking member to the actuating sleeve unlocking position.

6. A female coupling member according to claim 5, wherein the sleeve engaging member comprises sleeve engaging balls radially displaceably provided in radial holes radially extending through the tubular wall;
   the actuating sleeve having a ball receiving recess on the inner peripheral surface thereof that radially aligns with the sleeve engaging balls when the actuating sleeve is in the press-unlatch position;
   the sleeve locking member having an outer surface that has:
   a ball pressing portion that engages the sleeve engaging balls when the sleeve locking member is in the actuating sleeve locking position, causing the balls to be engaged in the ball receiving recess under pressure; and
   a ball releasing portion that allows the sleeve engaging balls to be displaced radially inward to disengage from the ball receiving recess when the sleeve locking member is in the actuating sleeve unlocking position.

7. A female coupling member according to claim 6, further comprising:
   an on-off valving element provided in the male coupling member receiving portion so as to be displaceable in the axial direction between a forward closed position where the on-off valving element closes a fluid passage that is provided in the female coupling member body in contiguity with the male coupling member receiving portion in the axial direction and a rear open position where the on-off valving element opens the fluid passage; and
   a second urging member for urging the on-off valving element into the forward closed position;
   wherein the sleeve locking member and on-off valving element are pushed rearward in the male coupling member receiving portion by the male coupling member as inserted thereinto, and when the on-off valving element is placed in the rear open position, the sleeve locking member is placed in the sleeve unlocking position.

8. A female coupling member according to claim 7, wherein the female coupling member body has a second on-off valving element for opening and closing the fluid passage, and the actuating sleeve allows the second on-off valving element to open only when the actuating sleeve is in the press-latch position.

9. A female coupling member according to claim 3, further comprising:
   a safety tube provided at the forward end of the female coupling member body, the safety tube being located radially outside and covering the actuating sleeve when in the press-latch position.

* * * * *